(12) United States Patent
Payet-Burin et al.

(10) Patent No.: US 11,404,830 B2
(45) Date of Patent: Aug. 2, 2022

(54) ELECTRICAL CONNECTION POINT MOUNTED IN A WALL IN A DWELLING AND ELECTRICAL INSTALLATION COMPRISING AT LEAST ONE SUCH CONNECTION POINT

(71) Applicant: Schneider Electric Industries SAS, Rueil Malmaison (FR)

(72) Inventors: Jean-Luc Payet-Burin, Voreppe (FR); Didier Vigouroux, Brignoud (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 15/519,925

(22) PCT Filed: Oct. 15, 2015

(86) PCT No.: PCT/FR2015/052771
§ 371 (c)(1),
(2) Date: Apr. 18, 2017

(87) PCT Pub. No.: WO2016/071599
PCT Pub. Date: May 12, 2016

(65) Prior Publication Data
US 2017/0338605 A1  Nov. 23, 2017

(30) Foreign Application Priority Data
Nov. 7, 2014 (FR) ...................... 1460798

(51) Int. Cl.
*H02G 3/00* (2006.01)
*H02B 1/40* (2006.01)
(Continued)

(52) U.S. Cl.
CPC ......... *H01R 13/73* (2013.01); *H01R 13/6683* (2013.01); *H01R 13/6691* (2013.01);
(Continued)

(58) Field of Classification Search
None
See application file for complete search history.

(56) References Cited

U.S. PATENT DOCUMENTS

| | | | |
|---|---|---|---|
| 5,399,806 A | 3/1995 | Olson | |
| 5,539,821 A * | 7/1996 | Blonder | H02J 7/0044 |
| | | | 379/446 |

(Continued)

FOREIGN PATENT DOCUMENTS

| | | |
|---|---|---|
| EP | 2 273 635 A2 | 1/2011 |
| FR | 3 000 310 A1 | 6/2014 |
| WO | 2009/056157 A1 | 5/2009 |

OTHER PUBLICATIONS

International Search Report dated Dec. 11, 2015 in PCT/FR2015/052771 filed Oct. 15, 2015.

*Primary Examiner* — Courtney L Smith
(74) *Attorney, Agent, or Firm* — Oblon, McClelland, Maier & Neustadt, L.L.P.

(57) ABSTRACT

An electrical connection point configured to electrically connect an electric load in a dwelling to a power grid. The connection point includes: a wall block, including first connection elements, the wall block configured to be mounted securely in a wall of the dwelling such that the first connection elements are electrically connected to corresponding portions of the grid; and a functional block configured to provide a specific electric function and including second connecting elements, wherein the functional block is configured to be removably mounted in the wall block, and thus interchangeable, the attachment providing the electrical connection of the second connection elements to the corresponding portions of the grid via the first connection elements, to allow the electric function to be brought into service.

26 Claims, 14 Drawing Sheets

(51) Int. Cl.
*H01R 13/73* (2006.01)
*H02B 1/48* (2006.01)
*H01R 13/66* (2006.01)
*H02B 1/015* (2006.01)
*H02G 3/12* (2006.01)

(52) U.S. Cl.
CPC .............. *H02B 1/015* (2013.01); *H02B 1/48* (2013.01); *H02G 3/00* (2013.01); *H02G 3/123* (2013.01)

(56) References Cited

U.S. PATENT DOCUMENTS

| | | | | |
|---|---|---|---|---|
| 6,309,248 | B1 * | 10/2001 | King | H01R 13/7135 361/42 |
| 6,341,981 | B1 * | 1/2002 | Gorman | H01R 13/652 174/53 |
| 6,379,164 | B1 * | 4/2002 | Cash, Jr. | H02G 3/00 439/106 |
| 6,993,289 | B2 * | 1/2006 | Janik | G06F 1/1632 320/107 |
| 7,522,615 | B2 * | 4/2009 | Binder | H04L 12/2803 370/401 |
| 9,048,640 | B2 * | 6/2015 | Gagne | H02G 3/02 |
| 10,103,530 | B2 * | 10/2018 | Rohmer | H05K 5/02 |
| 2008/0013909 | A1 * | 1/2008 | Kostet | G02B 6/4457 385/135 |
| 2010/0240249 | A1 * | 9/2010 | Kruse | H02G 3/18 439/535 |
| 2016/0111878 | A1 * | 4/2016 | Qureshi | H04R 27/00 307/39 |

\* cited by examiner

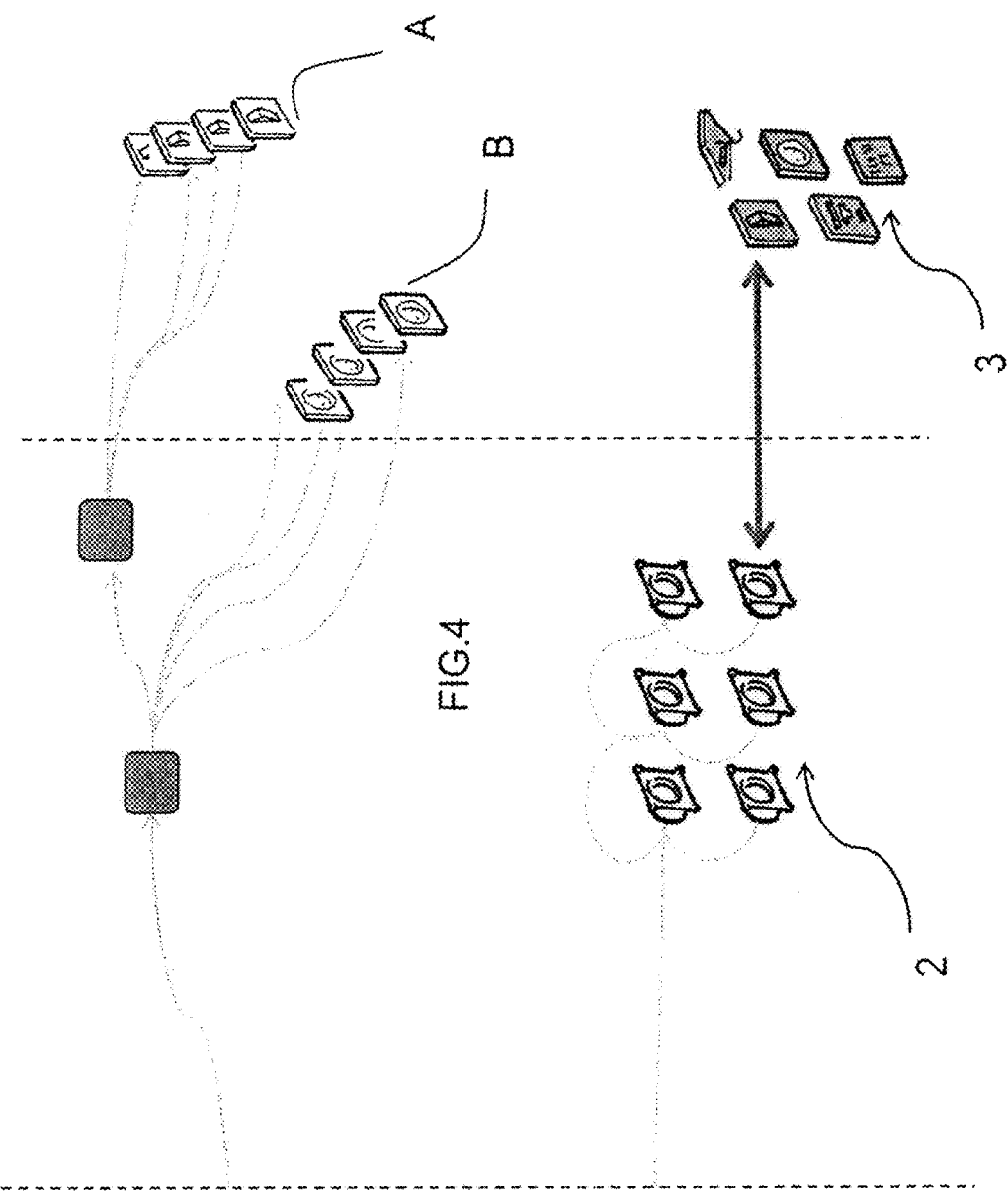

ELECTRICAL CONNECTION POINT MOUNTED IN A WALL IN A DWELLING AND ELECTRICAL INSTALLATION COMPRISING AT LEAST ONE SUCH CONNECTION POINT

TECHNICAL FIELD

The present invention concerns an electrical connection point intended to electrically link an electrical load in a dwelling to the electrical network, and an electrical installation comprising at least one such connection point.

STATE OF THE PRIOR ART

Nowadays, an electrical connection point is dedicated to a given use, such as for example a lighting point, an outlet, a switch, a presence detector, etc.

These points are fixed, and, as a general rule, changing their function is not feasible without the intervention of a professional, and, even in this case, the electrician will prefer to install a new electrical line comprising a new electrical connection point. Furthermore, in a dwelling, power strips or the like are appearing on a frequent basis and make it possible to perform functions of types such as electrical metering, DC power supplies, remote-controlled outlets, carrier current transmitters, pilot-wire transmitters, etc. The performance of these functions therefore requires the addition of extra components that are particularly bulky and unsightly.

DISCLOSURE OF THE INVENTION

The present invention solves these problems and provides an electrical connection point able to be modified at will in accordance with the local standard or the electrical function to be performed.

This connection point may be associated with a feeder of an electrical switchboard or else with a location in a dwelling, for information collection or control purposes.

To this end, one subject of the present invention is a connection point of the kind mentioned above, this connection point being characterized in that it comprises a first part called wall block comprising so-called first connection elements, this wall block being intended to be fixedly mounted in a wall of the dwelling in such a way that the so-called first connection elements are electrically linked to the corresponding parts of the network, and a second part called functional block intended to provide a particular electrical function and comprising so-called second connection elements, this functional block being suitable for being fixed removably in the wall block, thereby being interchangeable, this fixing leading to the electrical connection of the so-called second connection elements to the corresponding parts of the network via the so-called first connection elements, in such a way as to allow the aforementioned electrical function to be activated.

Thus, by virtue of the invention, this wall base will be installed by the electrician, and will no longer be disassembled, regardless of the scalability desired by the user or the electrician.

This connection point will be implemented in such a way as to adapt to the local standard or else to a newly created standard.

Thus, the user will be able to develop the uses of the connection points as a function of technical requirements and developments. He will have available a standardized connection platform for outlets, switches, dimmer switches, multiple outlets, devices for remotely controlling power supply, for saving energy, for programming energy distribution, for adding a carrier current connection, without taking the various power supply transformers into consideration. The user will therefore be able to include these functions in a new type of product that will be termed 'multifunctional electrical point'.

According to one particular feature, this wall block is implemented in such a way as to adapt to any type of functional block.

According to one particular feature, the function provided by the functional block is one of the functions included in the group comprising a manual control point, a communicating or non-communicating electrical outlet, a sensor, a receiver or an actuator.

According to another feature, the manual control point is one of the elements included in the group comprising a switch, a push-button, a rotary button and an up/down button.

According to another feature, the function associated with the communicating outlet is one of the functions included in the group comprising monitoring, automatic control and the function of measuring energy consumption.

According to another feature, the sensor is one of the elements included in the group comprising a presence sensor, a temperature sensor and a luminosity, humidity or else air quality sensor.

According to another feature, the receiver is one of the elements included in the group comprising musical ambience, a standby light, touch interfaces, an intercom and a buzzer.

According to another feature, the aforementioned functional block may be controlled locally and/or remotely from a fixed or portable terminal.

This feature makes it possible to reduce the number of control cables.

According to another feature, the aforementioned functional block comprises means for radio or PLC or Ethernet communication with a central box and/or with an electrical switchboard and/or a smartphone.

This makes it possible to optimize the installation by virtue of a link between the switchboard and the loads.

According to another feature, this connection point comprises means for establishing a peer-to-peer connection with one or more feeders of an electrical switchboard, or with a particular location in the aforementioned dwelling, for information collection or control purposes.

According to another feature, the wall block and the functional block each comprise means for establishing a peer-to-peer connection suitable for enabling peer-to-peer connection of the connection point with a centralized control monitoring device or else with the electrical switchboard. This addressing system makes it possible to perform load shedding or load multiplexing, which makes it possible to maximize the current actually flowing in the cable of a feeder, and to maximize the leakage currents permitted on one and the same feeder.

According to another feature, the means for establishing a peer-to-peer connection comprises coding provided on the wall block and able to be read by the functional block.

According to one particular implementation, the so-called first connection elements comprise connection clips, whereas the so-called second connection elements comprise pins.

This makes it possible for the electrician or the user to carry out the mounting of the functional block on the wall base with ease.

According to one particular feature, the functional block is pluggable onto the fixed wall block.

Advantageously, the wall block is implemented on the basis of a conventional standard outlet, the connection elements of which, in the form of pins, have been cut off and replaced by connection clips intended to interact with the so-called second connection elements of the functional block.

According to one particular implementation, the wall block is recessed into a flush-mounted housing of the electrical installation intended to be fixed in the wall, or in one piece with this flush-mounted housing.

Another subject of the present invention is an electrical installation comprising an electrical distribution switchboard, this installation being characterized in that it comprises at least one connection point including the features mentioned above, taken on their own or in combination, and means for the remote monitoring and/or control of the function(s) associated with these functional block(s), by the electrician or the occupant, by means of the electrical switchboard, of a dedicated box in the building, or directly.

According to one particular feature, this installation comprises means for the configuration, by the electrician, of the functions of the electrical distribution of the switchboard that are defined on the basis of new applications downloaded from a computerized shop.

According to another feature, the aforementioned downloaded functions are one or more of the functions included in the group comprising monitoring, lighting or else heating.

According to another feature, this installation comprises means for remotely consulting information in relation to these functions for remote diagnosis, and means for communicating information for remote troubleshooting.

According to another feature, this installation comprises means for remotely configuring warnings and/or access to alarms and faults, and to an archive.

According to another feature, this installation comprises means for programming scenarios that are adapted to the habits and to the requirements of the occupants.

According to another feature, this installation is of the single-phase, three-phase or three-phase plus neutral type.

BRIEF DESCRIPTION OF THE DRAWINGS

Other advantages and features of the invention, however, will become more apparent in the following detailed description that refers to the appended drawings, which are given solely by way of example and in which:

FIG. 4 illustrates one way of arranging electrical cables according to the prior art, FIG. 5 illustrates one advantageous way of arranging cables by virtue of the invention.

DETAILED DISCLOSURE OF A PLURALITY OF EMBODIMENTS

Figure 1:
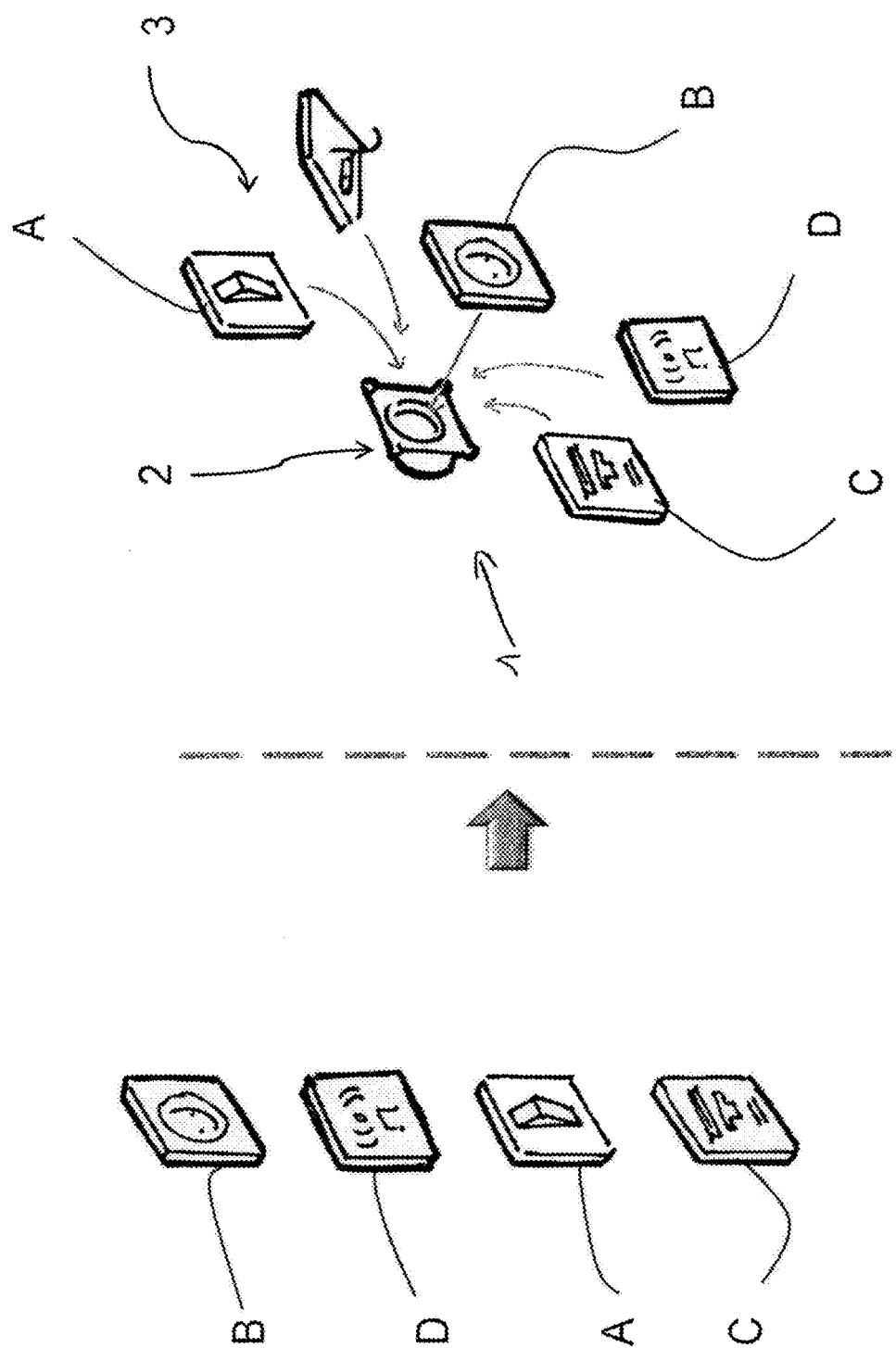
FIG. 1 is a perspective view, schematically showing a connection point according to the invention.

In FIG. 1, a connection point 1 according to the invention comprises a wall block or base 2 consisting primarily of a baseplate intended to be fixedly mounted in a wall and comprising so-called first connection elements (not visible in the figures) intended to be electrically linked to the corresponding parts of the electrical network. In this particular illustrated implementation, these connection elements are respectively associated with one phase, the neutral and earth, the network being single-phase.

This wall block 2 is intended to receive an element called functional block 3, which is intended to provide a particular electrical function. These functional blocks may be classified into a number of categories, such as for example manual control points A, communicating or non-communicating electrical outlets 13, sensors C and receivers D. These functional blocks 3 may be interchanged by the user or the electrician in accordance with the type of electrical function that has to be provided.

Thus, this manual control point will be able to take the form of a switch, a push-button, a rotary button, an up/down button, etc.

The communicating electrical outlets will be able to provide for example a monitoring, automatic control, energy consumption measurement function, etc.

The sensors will be able to detect a presence, a temperature, a luminosity, humidity, air quality, etc.

The receivers will be able for example to create a musical ambience, a standby light, form touch interfaces, provide an intercom or buzzer function, etc.

It will be noted that this wall base is universal in the sense that it adapts to the vast majority of functional blocks that may be used. The two elements, namely the wall block and the functional block, are implemented in such a way as to comply with the existing standard, or will be able to be implemented in such a way as to adapt to a new standard if a new standard were to have to be used.

Figure 2:
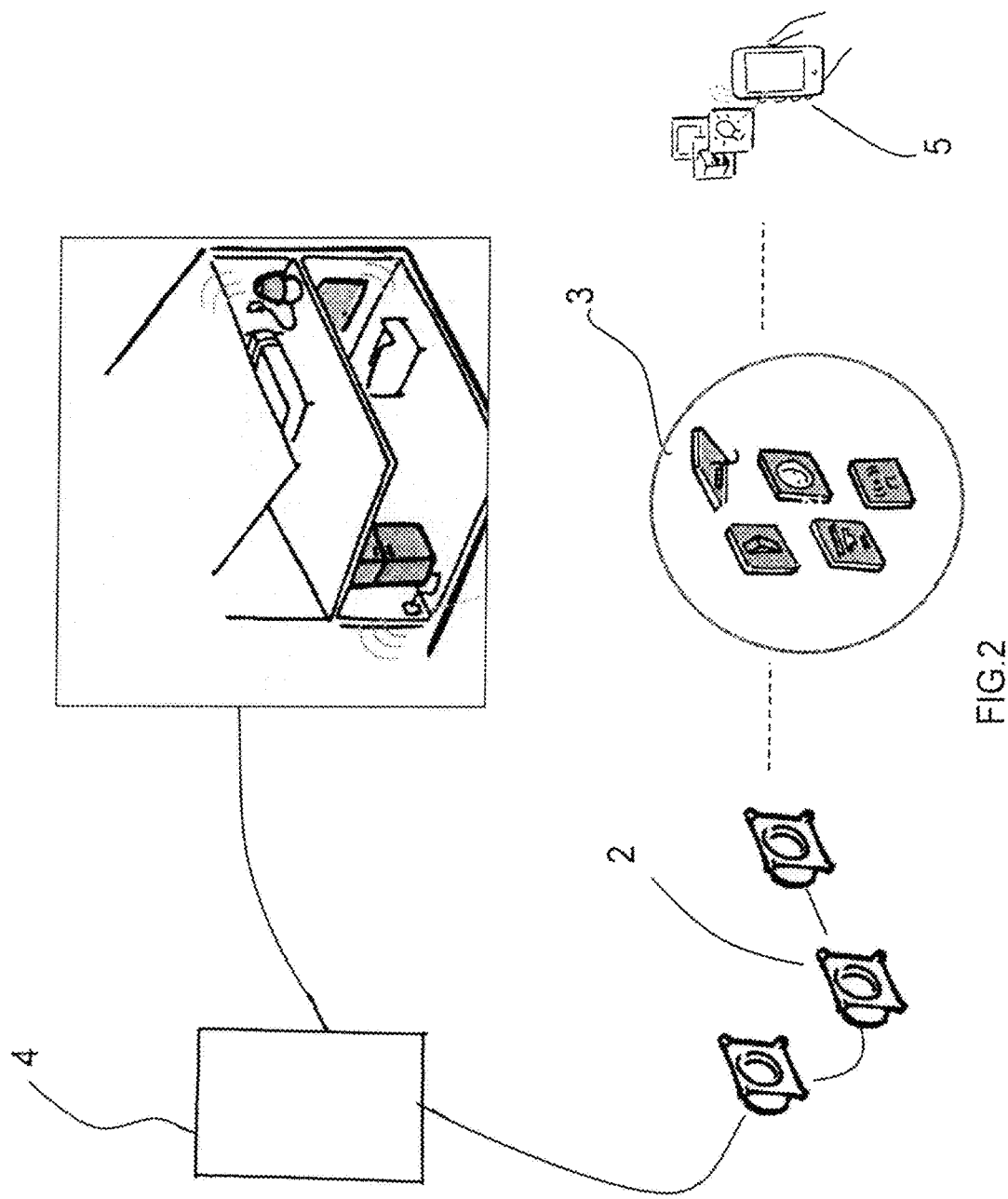
FIG. 2 is a view comprising a plurality of elements and illustrating the activation of a plurality of connection points according to the invention.

In FIG. 2, an electrical installation in accordance with one particular implementation of the invention comprises a plurality of universal wall blocks 2 intended to be distributed in various rooms of a dwelling and each intended to receive a functional block 3, these functional blocks 3 being interchangeable. This installation also comprises an electrical distribution switchboard 4.

This electrical installation may develop and be configured, monitored and controlled in real time via a fixed or mobile computer, advantageously a smartphone 5.

Thus, during operation, the electrician configures the electrical distribution functions of the switchboard 4 by downloading new applications from a 'digital store', these applications making it possible to provide monitoring, lighting, heating functions, etc. In the event of a fault, the electrician may consult information remotely, advise and diagnose remotely, troubleshoot remotely, etc.

The occupant remotely monitors his energy costs, his radiators, the controlled mechanical ventilation, the electric water heater, lamps and other electrical appliances, and the safety of his home and of his family.

The occupant configures warnings and remotely accesses alarms and faults, and an archive.

Scenarios may be programmed and adapted to habits and requirements, such as for example placing the heating into economy mode when the user leaves his home, opening the shutters when he wakes up, or a scenario for the weekend that differs from a scenario for the rest of the week.

Figure 3:
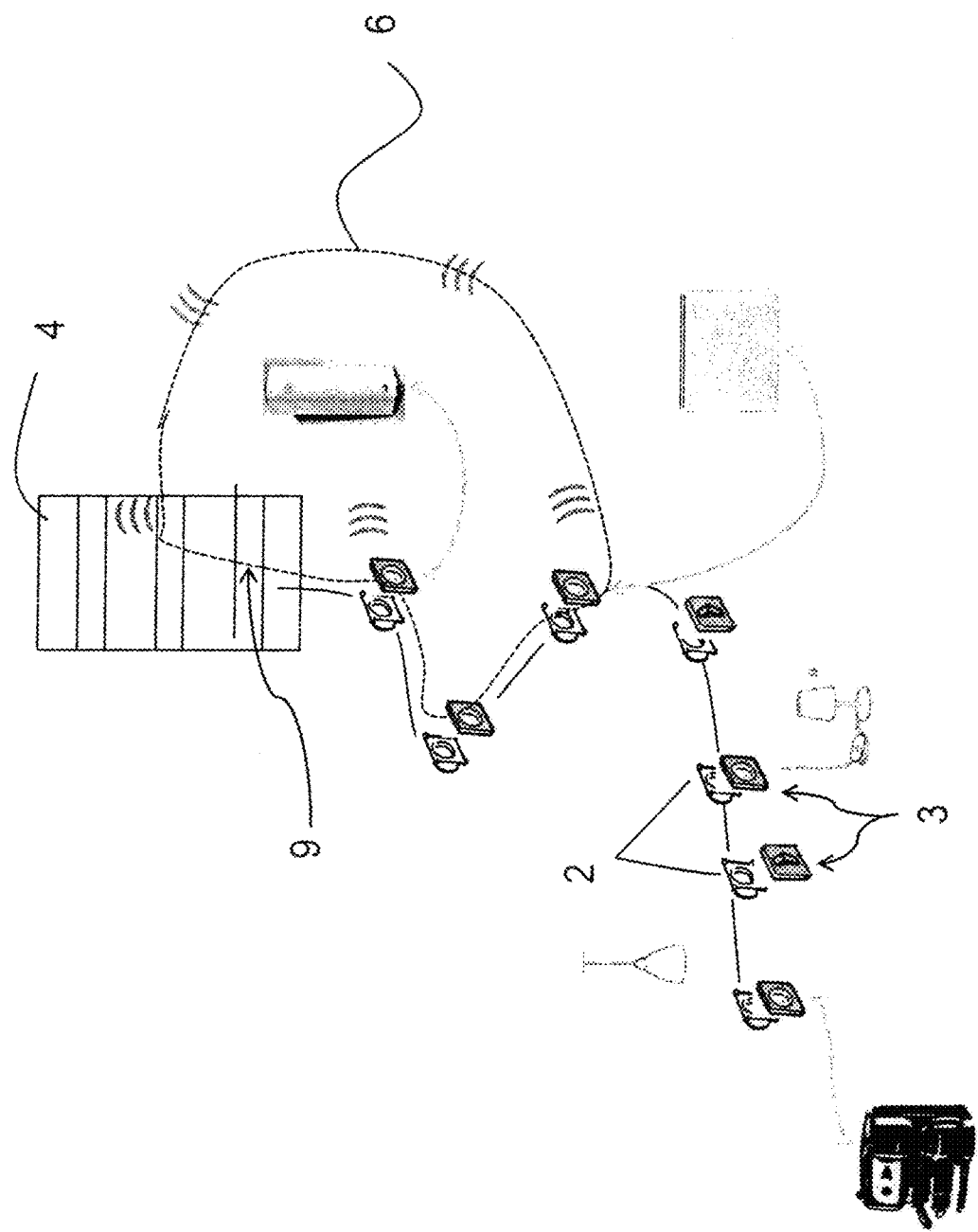
FIG. 3 illustrates the activation of a plurality of connection points on an electrical line associated with a feeder of a switchboard.
Figure 6:
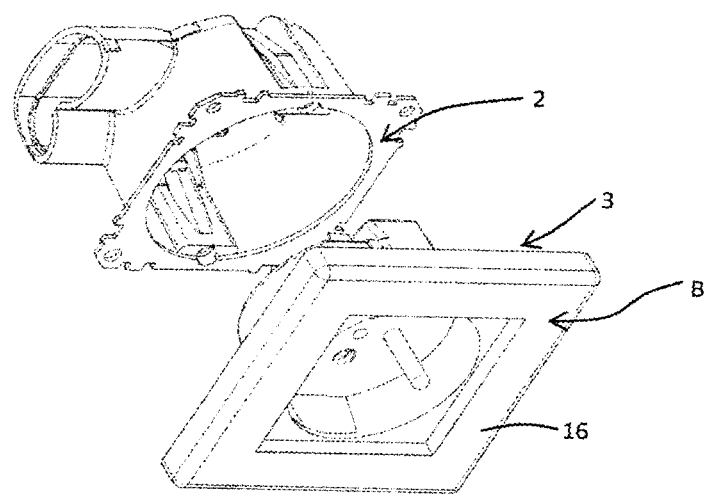
FIG. 6 is a perspective view, illustrating a wall base and a faceplate for an outlet, according to one particular implementation of the invention.
Figure 7:
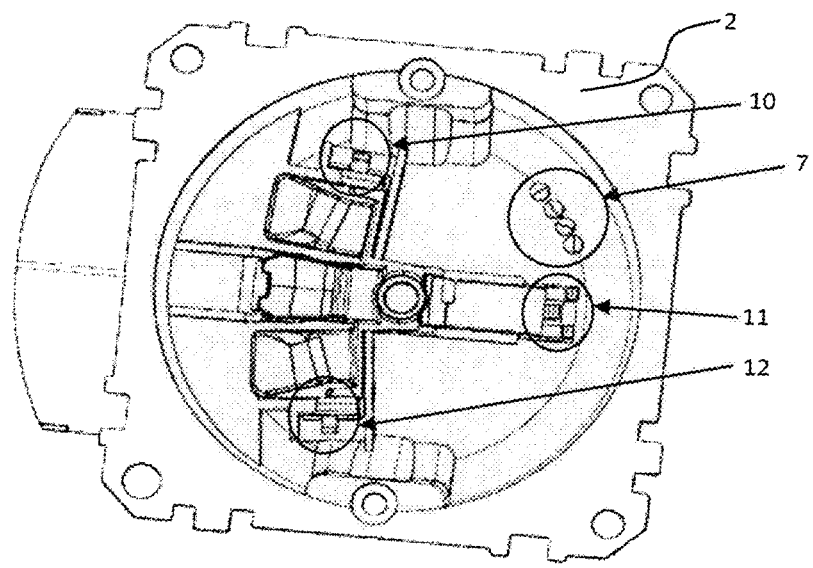
FIG. 7 is a plan view of this wall base.
Figure 8:
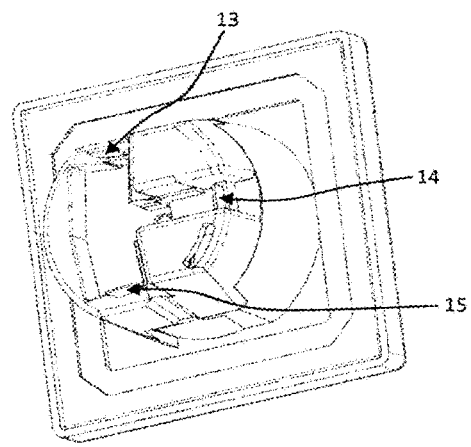
FIG. 8 is a perspective view, illustrating the rear part of the faceplate of the aforementioned outlet.
Figure 9:
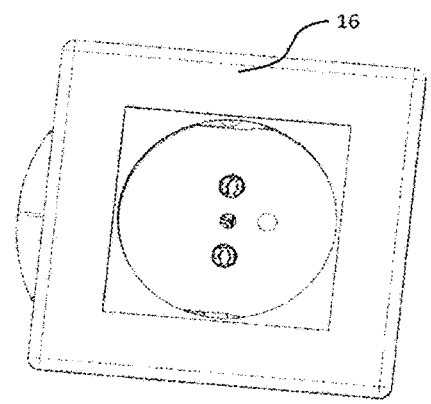
FIG. 9 is a front view of said outlet faceplate.
Figure 10:
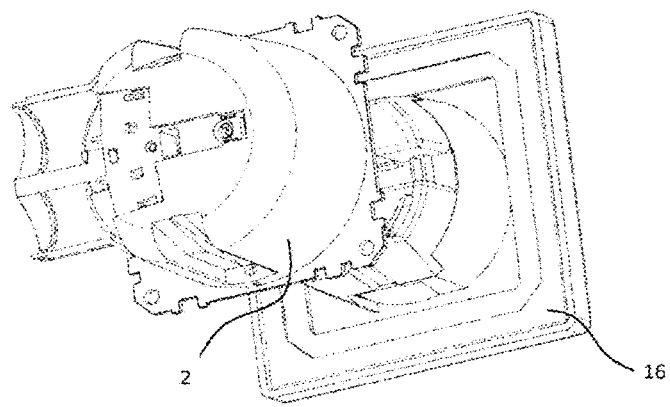
FIG. 10 is a perspective view, illustrating, seen from the rear, the mounting of the faceplate on the wall base.
Figure 11:
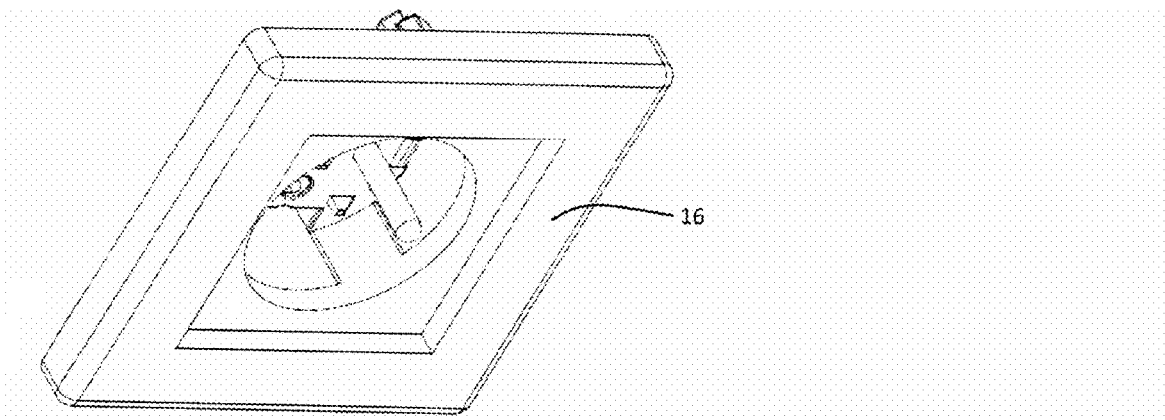
FIGS. 11 and 12 are respectively a perspective view and a front view, showing the front part of said faceplate.
Figure 12:
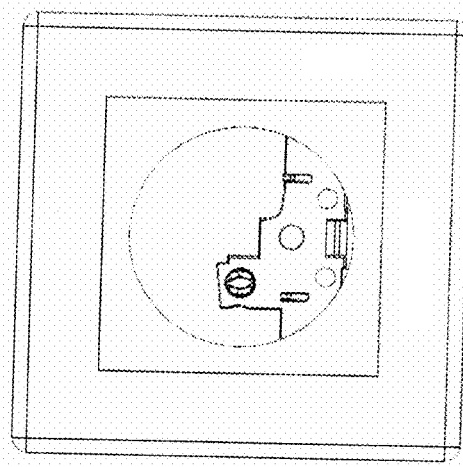
Figure 13:
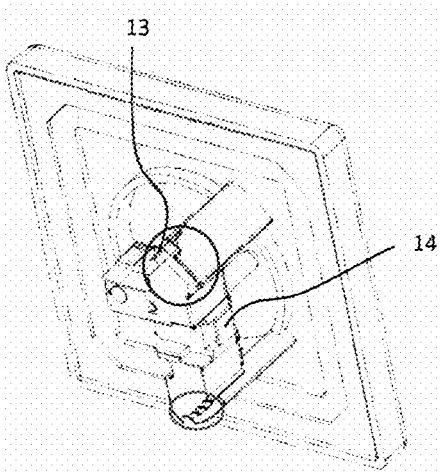
FIGS. 13 and 14 are respectively two perspective views, showing the rear part of said faceplate.
Figure 14:
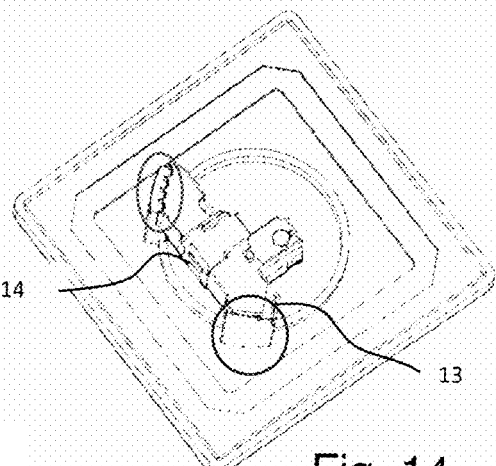
Figure 15:
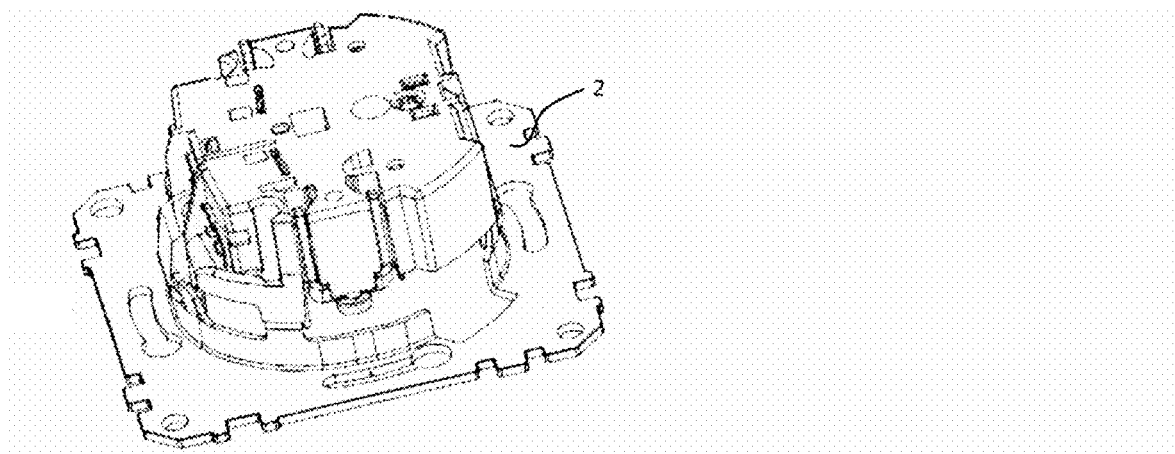
FIGS. 15 to 17 are respectively a perspective view of the wall base seen from the rear, a front view, seen from the front, of said base, and a perspective view of the base showing the inner part thereof.
Figure 16:
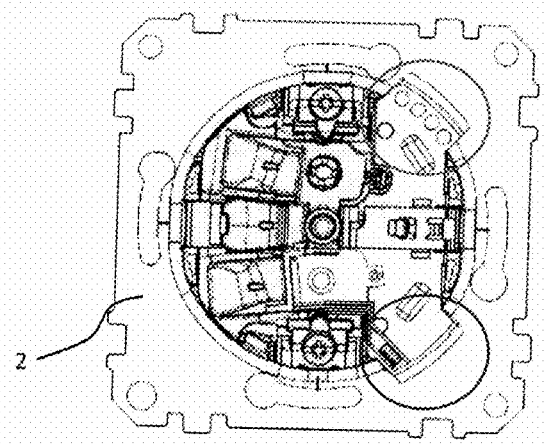
Figure 17:
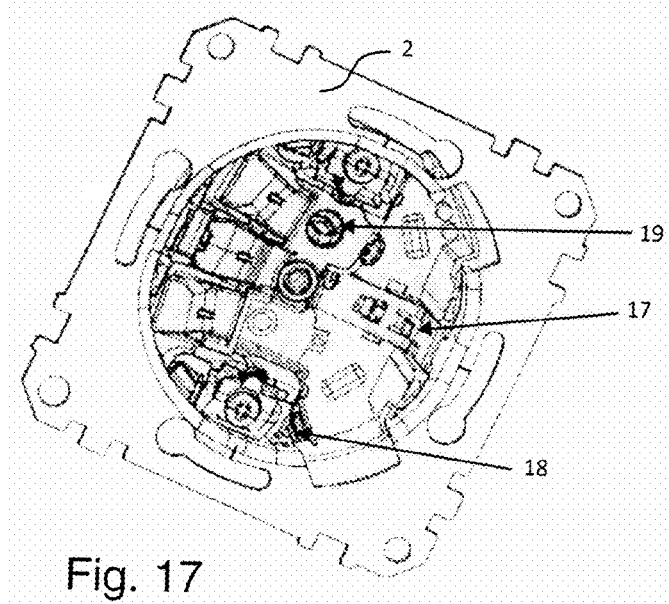
Figure 18:
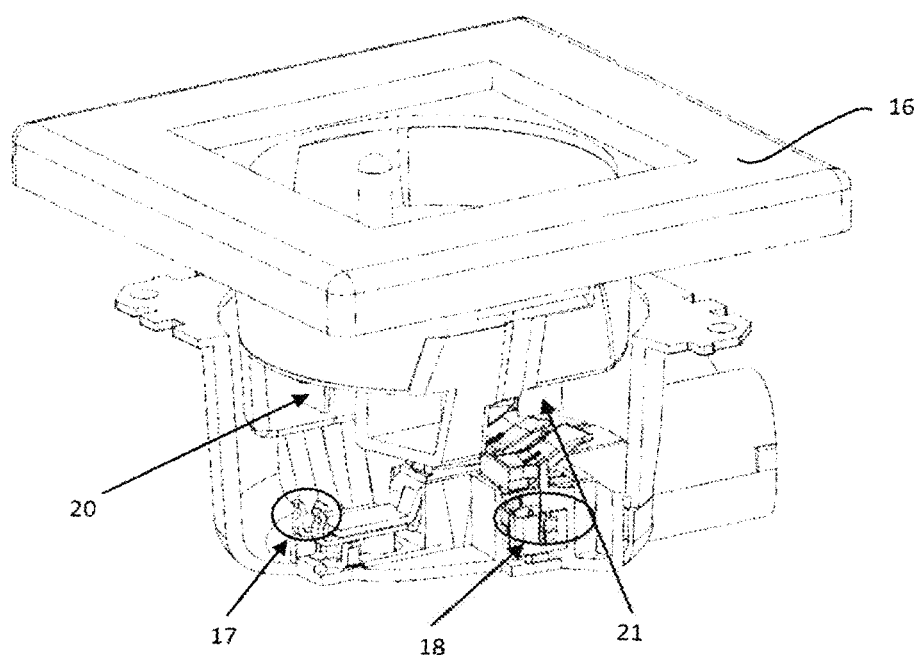
FIG. 18 is a perspective view including a cut-away section and illustrating the mounting of the outlet faceplate on the wall base.
Figure 20:
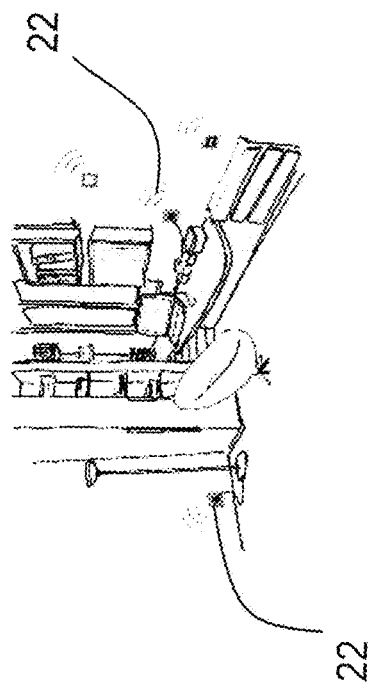
FIGS. 19 to 22 are four illustrations, showing the activation of a functional element intended to measure electrical consumption.
Figure 22:
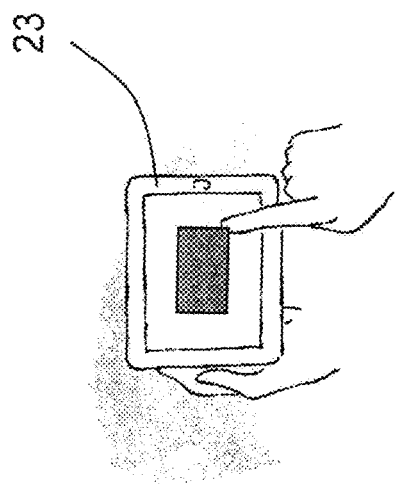

In FIG. 3, it can be seen that it is possible, by virtue of the invention, to create an electrical loop for capillary load shedding 6.

This is made possible by the fact that the wall block 2 comprises coding 7 able to interact with corresponding coding belonging to the functional block, this coding being associated with a feeder 9 of the electrical switchboard 4. Thus, an entire line may be encoded. This coding may be read on the universal wall base 2, and then radiofrequency communication, for example ZigBee, or PLC, may be established between the corresponding functional block 3 and the switchboard 4. It is thus possible to perform load shedding as a function of the requirements of the user and of the electrical distribution.

This possibility of performing load shedding makes it possible to maximize the current actually flowing in the cable of a feeder.

Indeed, this capillary load shedding makes it possible to multiplex the intensities used by large loads.

It also makes it possible to increase the number of load points per feeder that the switchboard can monitor.

It also makes it possible to mix lighting points, outlets, switches and sensors on one and the same feeder.

It also makes it possible to warn and to shed loads in accordance with the priorities of the user.

It also makes it possible to dispense with all control cabling (back-and-forth, return) and to reduce the number of load-specific feeders (controlled mechanical ventilation, refrigerator, washing machine, water heater, etc.).

This reasoning also applies to leakage currents, and makes it possible, on one and the same feeder, to shed loads as a function of their leakage current if necessary.

The radio or PLC communication system and the universality of the wall block make it possible to move from a method of cabling of octopus type, as illustrated in FIG. 4, to a method of cabling of 'daisy chain' type, as illustrated in FIG. 5, which makes it possible to obtain a considerable reduction in the number of cables used.

FIGS. 6 to 14 show one particular implementation of a connection point according to the invention, wherein the wall block 2 is intended to be installed in the wall in place of a conventional flush-mounted box.

In this particular implementation, the functional block 3 is a conventional outlet.

This wall block 2 is formed by a block comprising a hollowed-out part, fixed at the bottom of which are so-called first connection elements 10,11,12 intended to be electrically linked to the corresponding electrical connection elements of the electrical network. These so-called first connection elements 10,11,12, in this particular implementation, are in the form of connection clips intended to receive connection elements in the form of pins 13,14,15 provided on the outlet during fixing of the outlet on the wall block, this fixing making it possible to perform the electrical connection of these pins of the outlet with the corresponding connection elements of the network, respectively representing one phase, the neutral and earth in a single-phase network. By virtue of these connection clips, the functional block 3 is plugged onto the wall base 2. FIGS. 11 to 14 illustrate more particularly the faceplate 16 of the outlet comprising the aforementioned pins.

FIGS. 15 to 18 show one implementation wherein the wall block 2 has been integrated into an existing flush-mounted housing 31.

In this case, the wall block 2 comprises two connection clips 17,18, the pin of the neutral 19 already being integrated into the wall block 2 and will pass directly through the outlet 3, these two clips 17,18 being intended to interact with two pins 20,21 of the outlet 3.

The operation of a plurality of connection points according to the invention will be described in what follows with reference to FIGS. 19 to 26.

Figure 19:
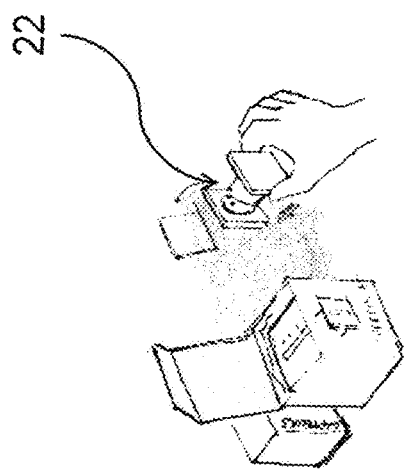
Figure 21:
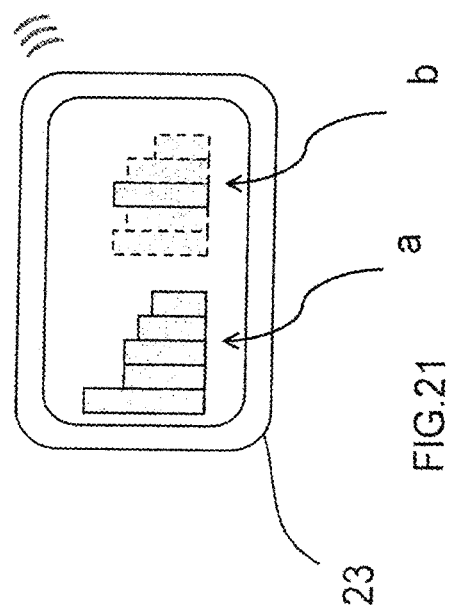

In FIG. 19, the user receives the modules 22 for measuring consumption that he has ordered from a digital store. He then installs them in his children's bedrooms. After having activated these modules, he downloads the appropriate application onto a tablet 23. From this tablet, two family members may compare their respective energy consumptions a,b for the week.

Figure 23:
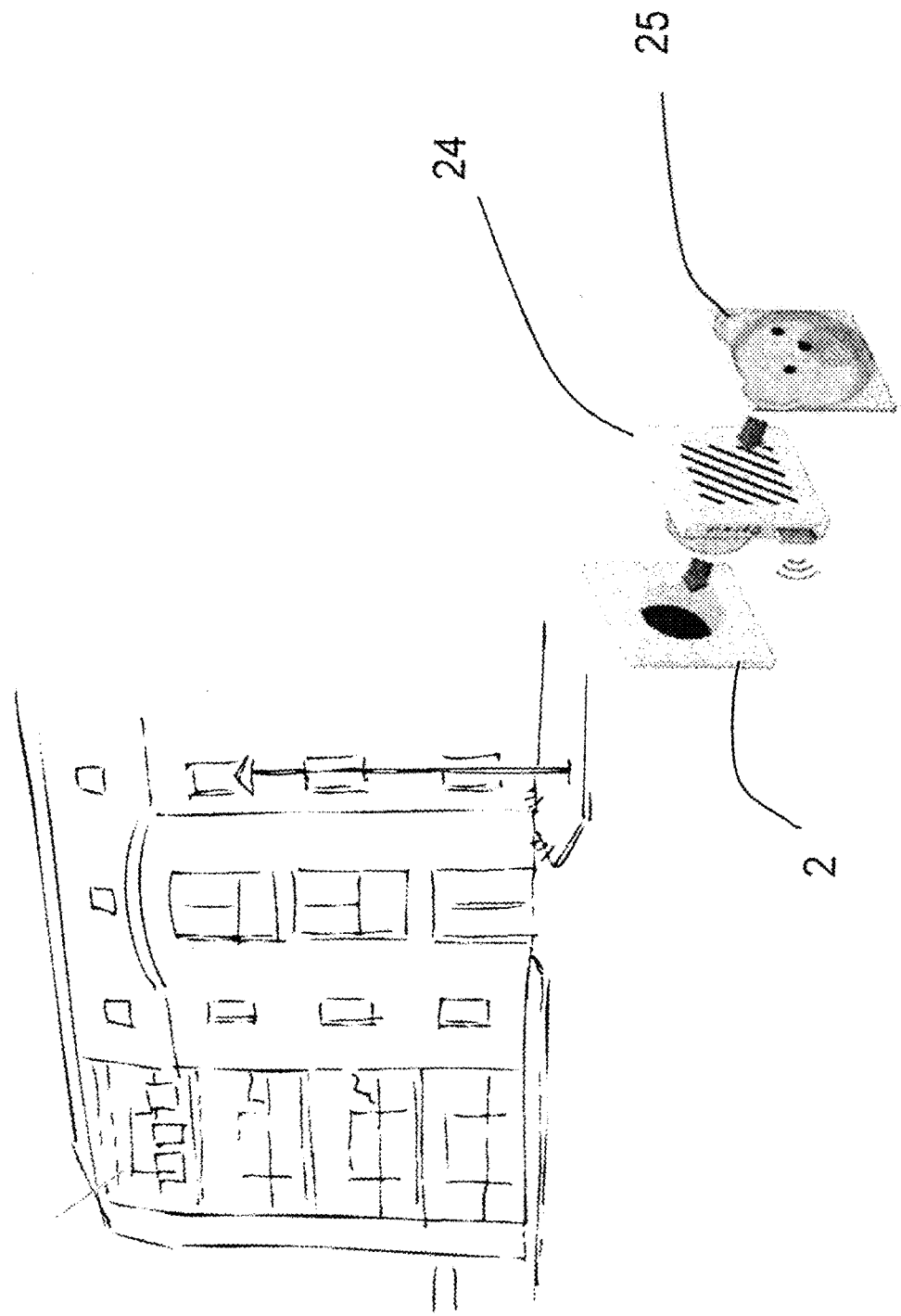
FIGS. 23 to 25 illustrate the setup and use of functional elements, taking the form respectively of a baby monitor for FIG. 23, a thermostat, an outlet and a motion detector for FIG. 24, and a sound emission module and a module intended to emit light for FIG. 25.
Figure 24:
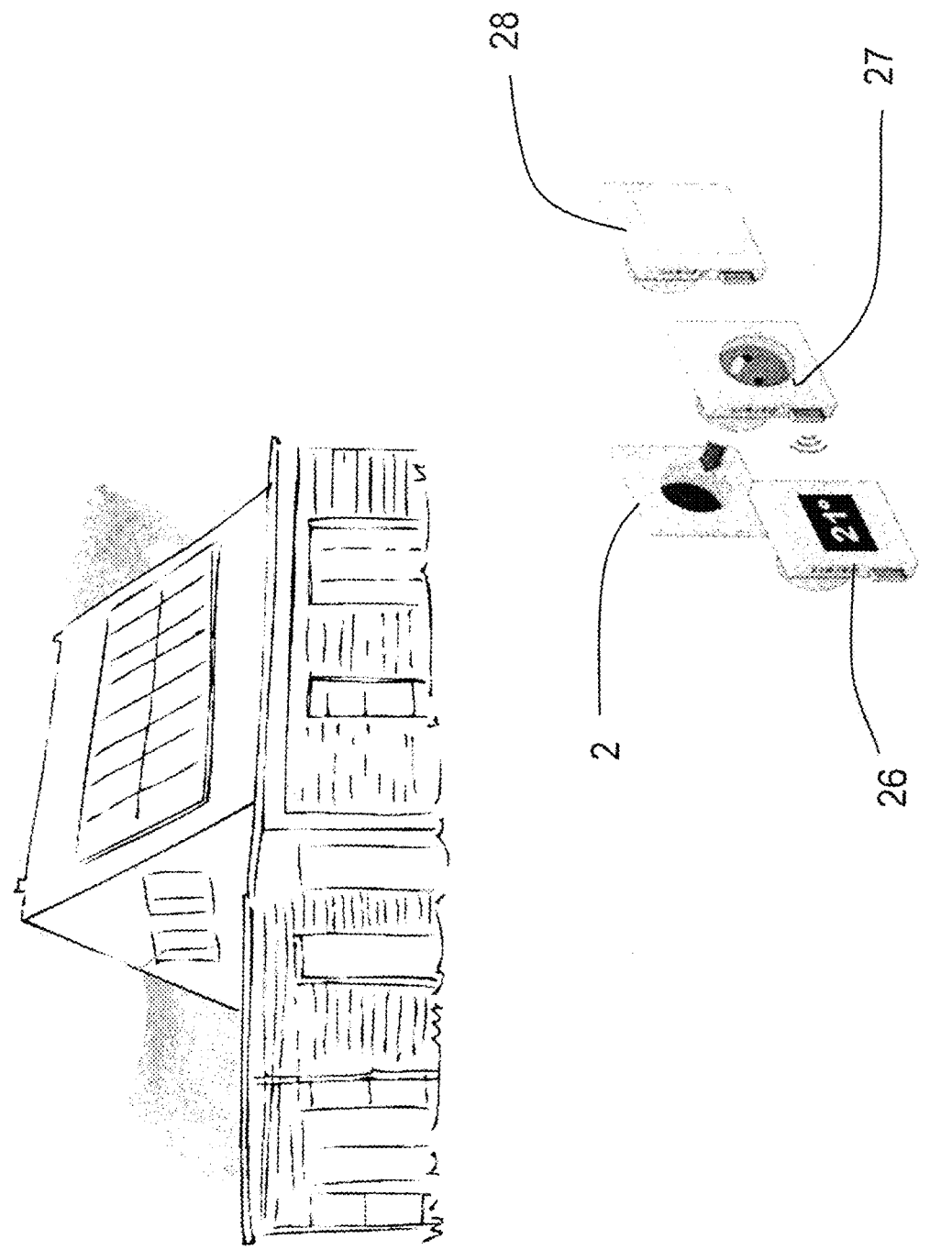

In FIG. 23, a user has installed a module 24 having the function of a baby monitor, ordered online, in a child's bedroom, and another in the kitchen. He has then printed, in 3D, a decorative pattern 25 that he has been able to fix on the module in such a way as to customize his module. Following this, he has installed the appropriate application on his smartphone, and is thus able to control his baby monitor remotely. In FIG. 24, what have been installed are a thermostat module 26, an outlet 27 and a motion detection module 28.

Figure 25:
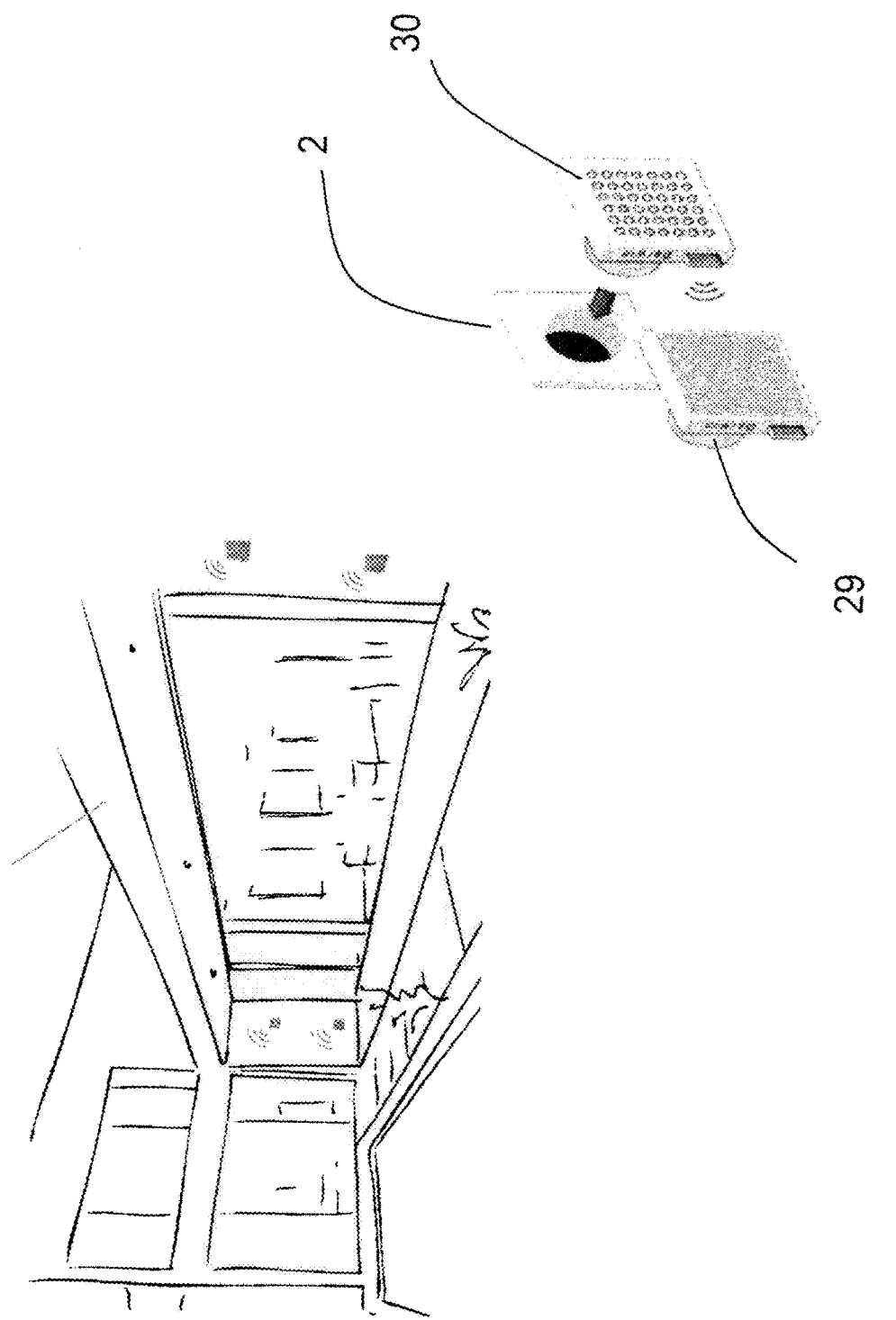
Figure 26:
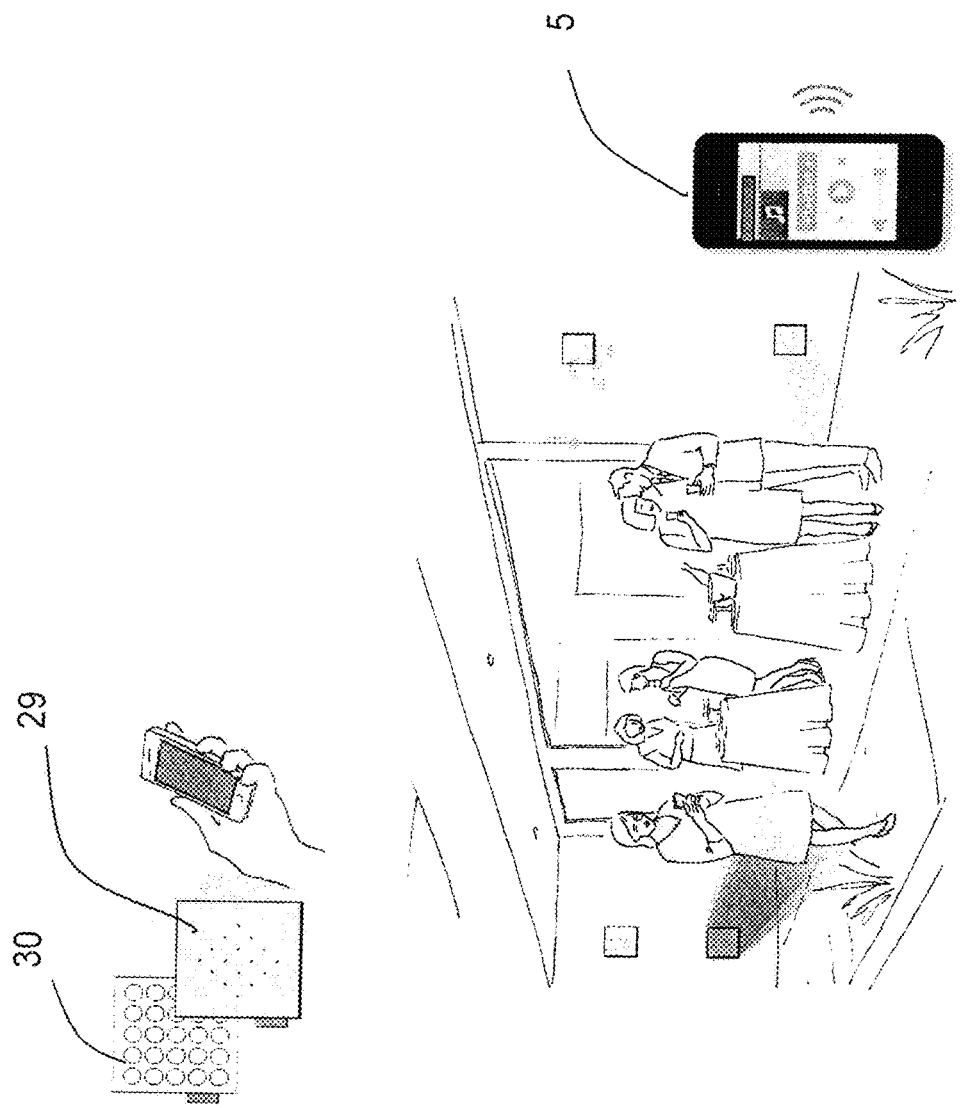
FIG. 26 illustrates the management by the user of these two elements respectively for emitting sound and for emitting light.

In FIG. 25, what have been installed are a sound production module 29 and a light production module 30. Furthermore, in FIG. 26, the user controls these two modules 29,30 remotely by means of a smartphone 5.

By virtue of the invention, what is created is a new interface between the professional world of the electrician and the consumer.

This point is installed by the electrician, and will no longer be disassembled, regardless of the scalability that it will receive. This point is implemented in such a way as to exactly adhere to the rules and customs in force. This point makes it possible to perform either conventional outlet functions or more sophisticated functions, such as measurement or load shedding, or any other function, such as that of a thermostat, presence detector, gas detector, 5 V power supply, etc. It may dialog by radio with a central box, and may be associated with a switchboard feeder.

The universal wall base has been designed in such a way as to carry hard coding, either mechanically or electronically or through soft coding. This coding will be read by the functional elements that will be plugged onto the electrical point. This coding may be removed or parameterized by a tool or by disassembling the electrical point. The functional system may be installed easily by a layperson. The functional elements that will be plugged in may be very basic and perform only the function of a standard outlet. They may be more sophisticated and perform an autonomous function, such as a programmable hourly pulse, or else they may communicate with the switchboard by radio, PLC or other media, and are a key element of a system that makes it possible to perform much more sophisticated functions. They make it possible to provide the link between electrical distribution, loads and the consumer. The advantages linked to the invention from the point of view of the switchboard engineer are that he may customize his installation at the last minute and may sell extra functionalities without destroying the existing hardware.

He may correct any errors directly on site. The travel time to and from the distributor is reduced. The time required for mounting elements such as outlets, lamps etc. is reduced.

The invention also makes it possible to optimize hardware stocks, and to reduce the time between purchasing the hardware and paying therefor.

The occupant may customize his comfort as a function of his own requirements and of his lifestyle, and develop his home as a function of the stages of his life.

The invention is not limited to the embodiments described and illustrated, which have been given merely by way of example.

One or more of the functional elements may therefore be an actuator, a dimmer switch, a timer clock, etc.

By contrast, the invention comprises all the technical equivalents of the means described, as well as combinations thereof if these are implemented in its spirit.

The invention claimed is:

1. An electrical connection point configured to electrically link an electrical load in a dwelling to an electrical network, comprising:
   a wall block comprising a first portion to which first connection elements are fixed and a second portion to which hard coding elements are fixed, the wall block configured to be fixedly mounted in a wall of the dwelling such that the first connection elements are electrically linked to corresponding parts of the network; and
   a functional block configured to provide a particular electrical function and comprising a third portion having second connection elements and a fourth portion configured to be inserted into the second portion, wherein
   the functional block is configured to be fixed removably in the wall block, thereby being interchangeable, the fixing leading to electrical connection of the second connection elements to the corresponding parts of the network via the first connection elements, to allow the electrical function to be activated, and insertion of the fourth portion into the second portion,
   the hard coding elements are configured to display a code, and
   the fourth portion has an aperture corresponding to the hard coding elements.

2. The connection point as claimed in claim 1, wherein the wall block is implemented to adapt to any type of functional block.

3. The connection point as claimed in claim 1, wherein the function provided by the functional block is one of functions included in the group of a manual control point, a communicating or non-communicating electrical outlet, a sensor, a receiver, and an actuator.

4. The connection point as claimed in claim 3, wherein the manual control point is one of elements included in the group of a switch, a push-button, a rotary button, and an up/down button.

5. The connection point as claimed in claim 3, wherein the function associated with the communicating outlet is one of functions included in the group of monitoring, automatic control, and measuring energy consumption.

6. The connection point as claimed in claim 3, wherein the sensor is one of elements included in the group of a presence sensor, a temperature sensor, a luminosity sensor, a humidity sensor, and an air quality sensor.

7. The connection point as claimed in claim 3, wherein the receiver is one of elements included in the group of musical ambience, a standby light, touch interfaces, an intercom, and a buzzer.

8. The connection point as claimed in claim 1, wherein the functional block may be controlled locally and/or remotely from a fixed or portable terminal.

9. The connection point as claimed in claim 1, wherein the functional block comprises means for radio or PLC or Ethernet communication with a central box and/or with an electrical switchboard and/or a smartphone.

10. The connection point as claimed in claim 1, wherein the wall block and the functional block are configured to establish a peer-to-peer connection with one or more feeders of an electrical switchboard, or with a particular location in the dwelling, for information collection or control purposes.

11. The connection point as claimed in claim 1, wherein the wall block and the functional block are each configured to enable peer-to-peer connection of the connection point with a centralized control monitoring device or with an electrical switchboard.

12. The connection point as claimed in claim 1, wherein the hard coding elements provided on the wall block are configured to be parameterized by a user.

13. The connection point as claimed in claim 1, wherein the first connection elements comprise connection clips, and the second connection elements comprise pins.

14. The connection point as claimed in claim 1, wherein the functional block is pluggable onto the fixed wall block.

15. The connection point as claimed in claim 1, wherein the wall block is implemented based on a conventional standard outlet, connection elements of which, in a form of pins, have been cut off and replaced by connection clips configured to interact with the second connection elements of the functional block.

16. The connection point as claimed in claim 1, wherein the wall block is recessed into a flush-mounted housing of an electrical installation configured to be fixed in the wall, or in one piece with the flush-mounted housing.

17. An electrical installation comprising:
   an electrical distribution switchboard, comprising:
   the electrical connection point as claimed in claim 1; and
   means for remote monitoring and/or control of functions associated with the functional block, by an electrician or an occupant, by the electrical switchboard, of a dedicated box in the dwelling, or directly.

18. The installation as claimed in claim 17, further comprising means for configuration, by the electrician, of the functions of the electrical distribution of the switchboard that are defined based on new applications downloaded from a computerized shop.

19. The installation as claimed in claim 18, wherein the downloaded functions are one or more of functions included in the group of monitoring, lighting, and heating.

20. The electrical installation as claimed in claim 18, further comprising means for remotely consulting information in relation to the functions for remote diagnosis, and means for communicating information for remote troubleshooting.

21. The electrical installation as claimed in claim 17, further comprising means for remotely configuring warnings and/or access to alarms and faults, and to an archive.

22. The electrical installation as claimed in claim 17, further comprising means for programming scenarios that are adapted to habits and to requirements of the occupants.

23. The electrical installation as claimed in claim 17, of single-phase, three-phase, or three-phase plus neutral type.

24. The connection point as claimed in claim 1, wherein the hard coding elements provided on the wall block are associated with a feeder line of the electrical network.

25. The connection point as claimed in claim 1, wherein the hard coding elements provided on the wall block are mechanical hard coding elements.

26. The connection point as claimed in claim 1, wherein the aperture is configured to allow the hard coding elements to be visible therethrough.

* * * * *